Sept. 5, 1961 E. G. THURSTON ET AL 2,998,741
ELECTRONIC PIANO
Filed Oct. 29, 1956 7 Sheets-Sheet 2
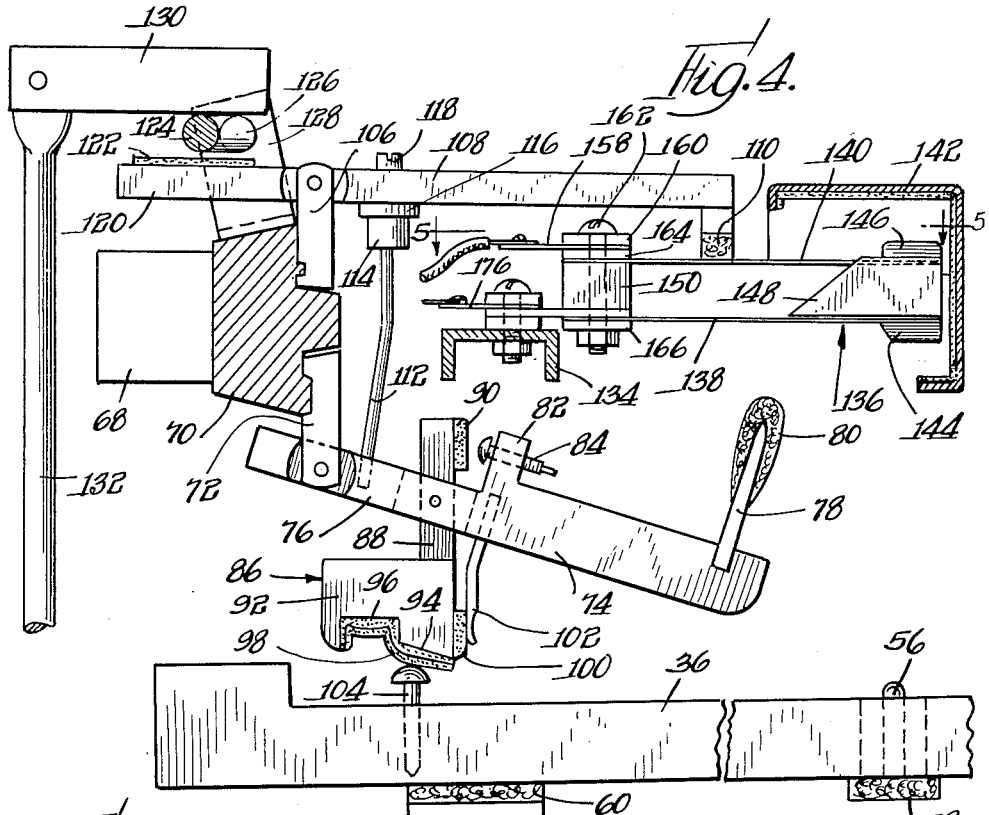
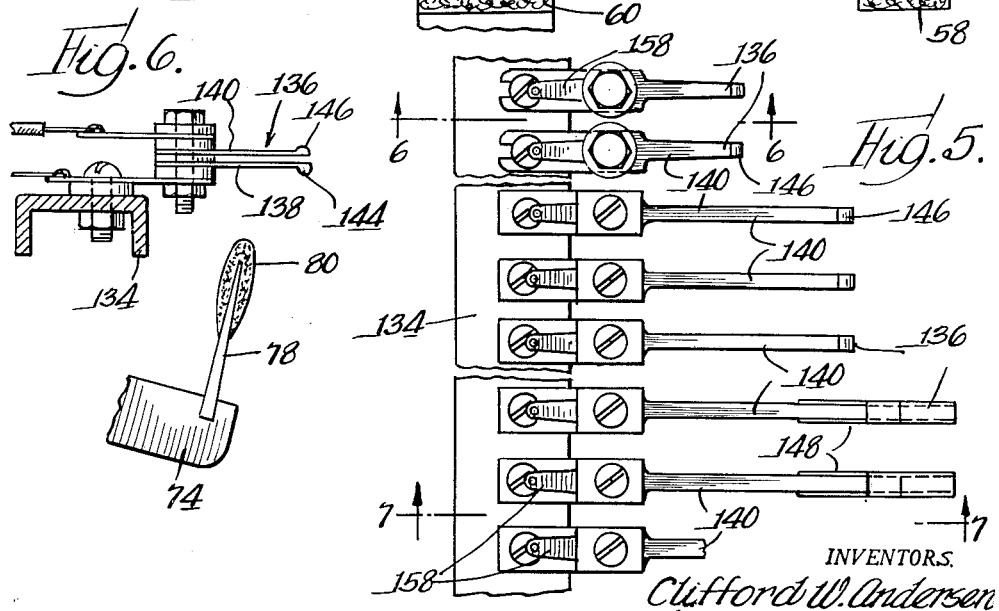
INVENTORS.
Clifford W. Andersen
Edward G. Thurston
By: Olson & Trexler attys

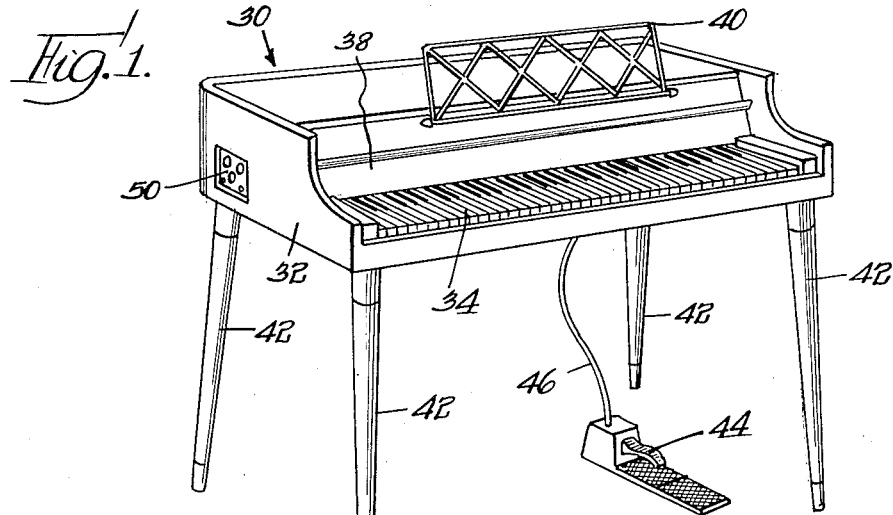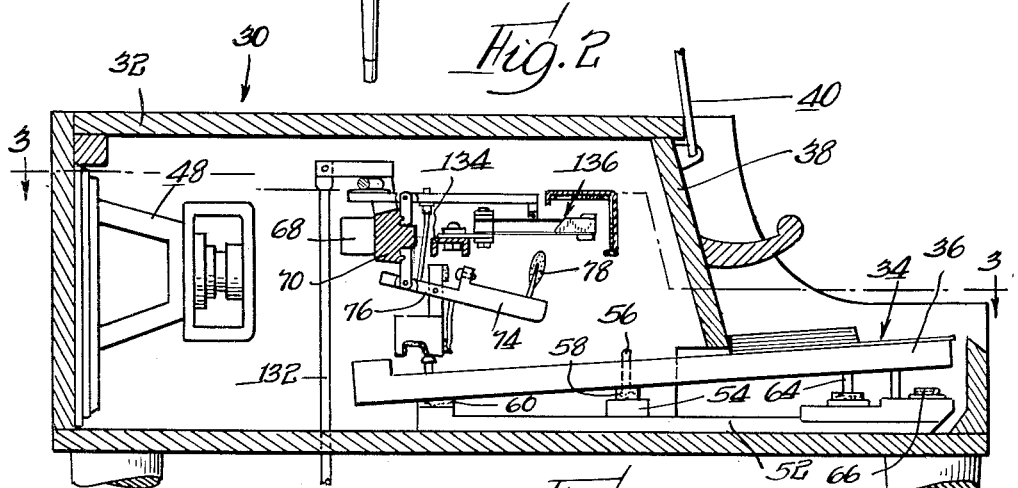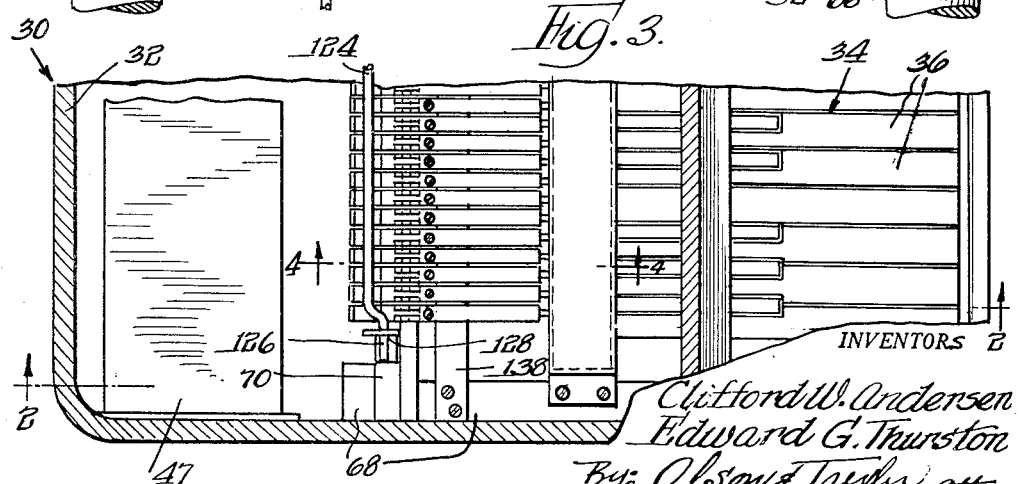

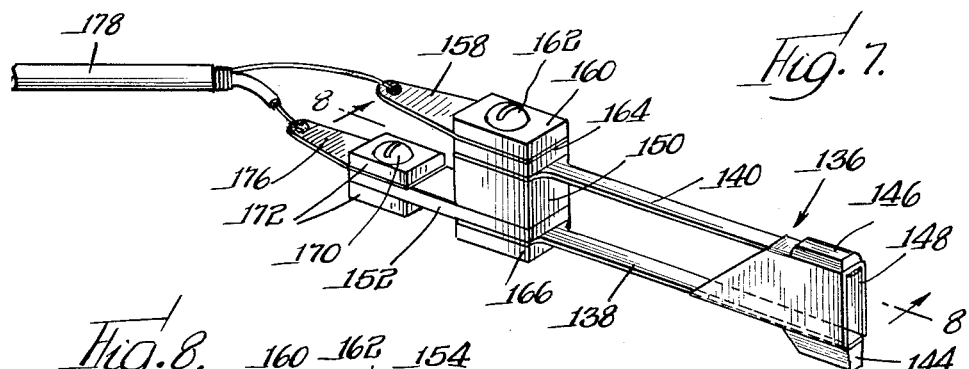
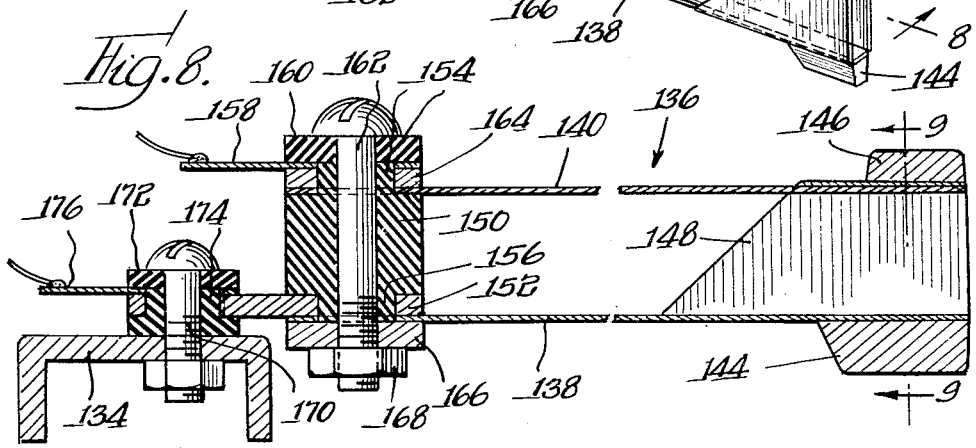
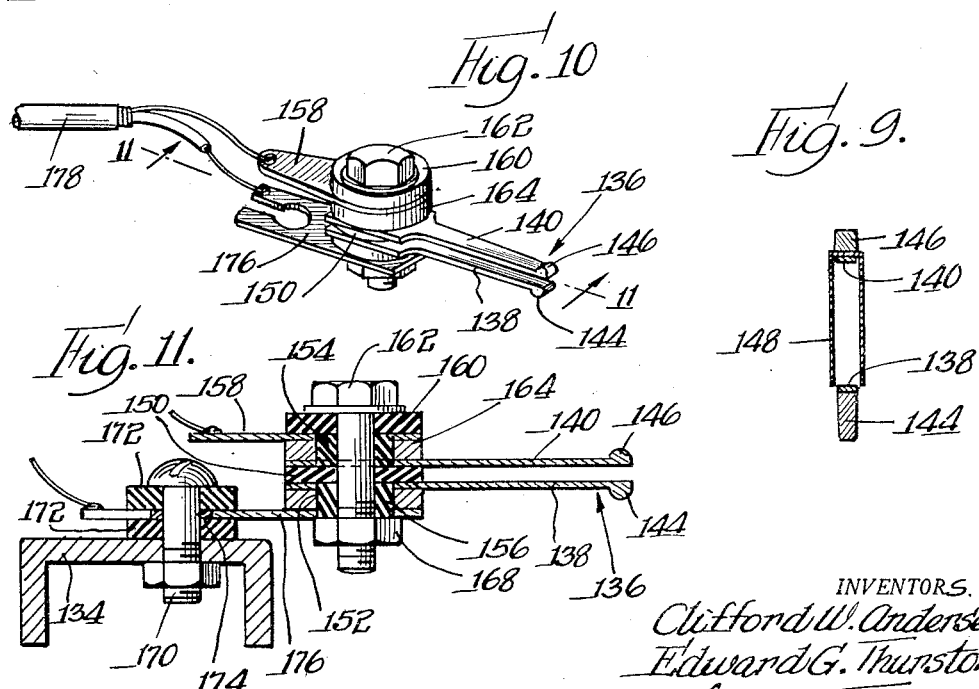
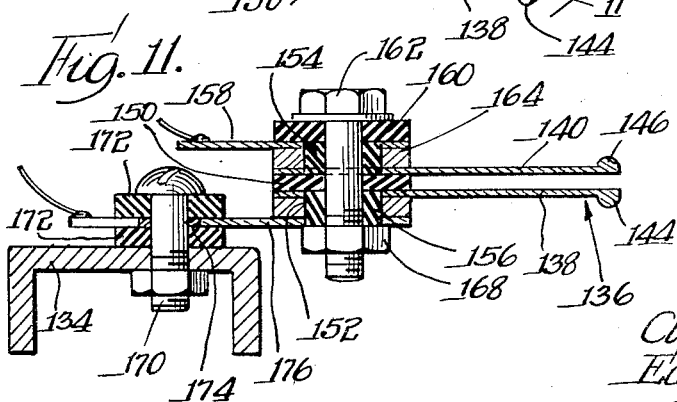

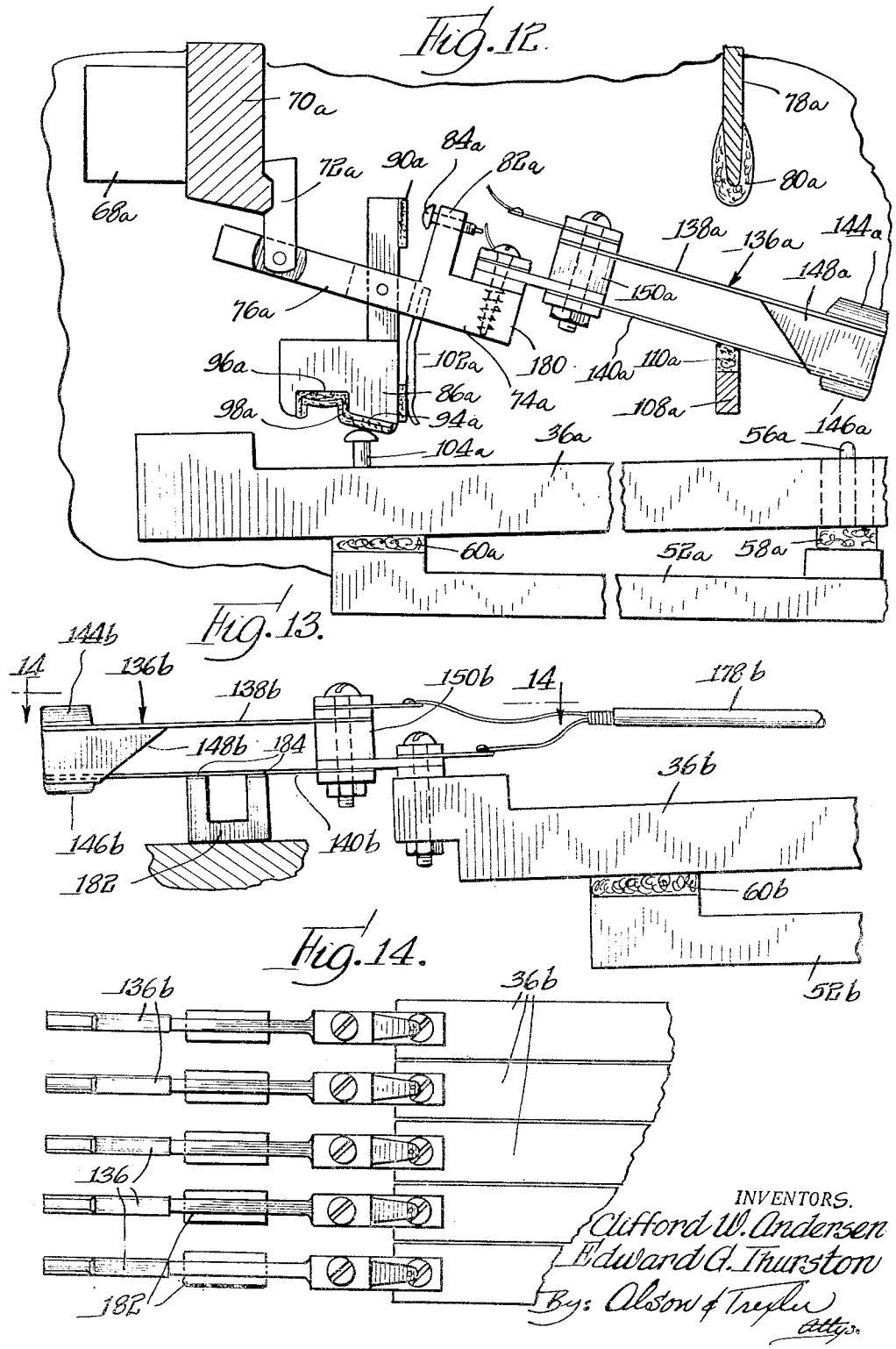

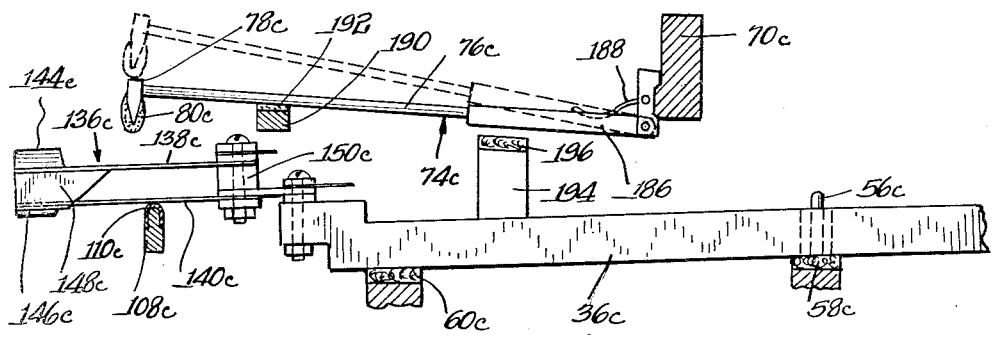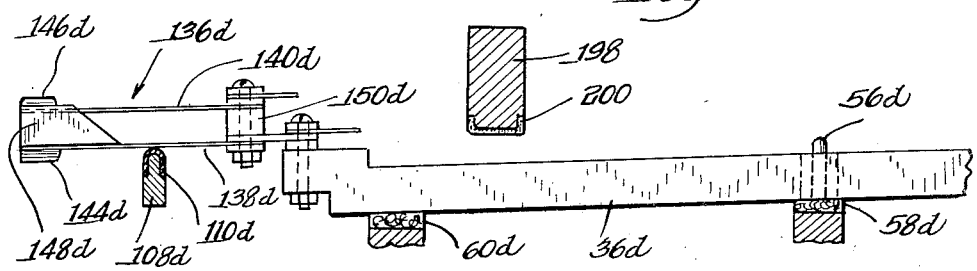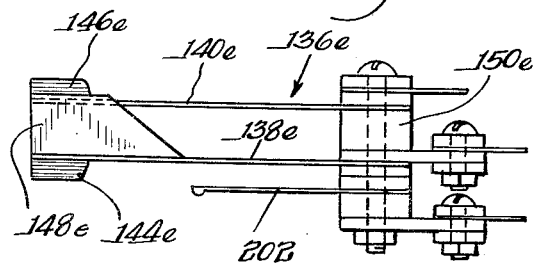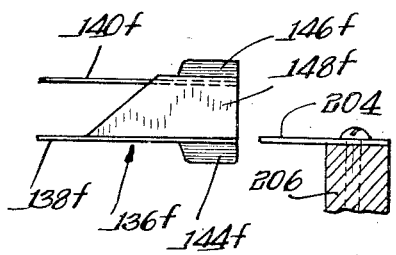

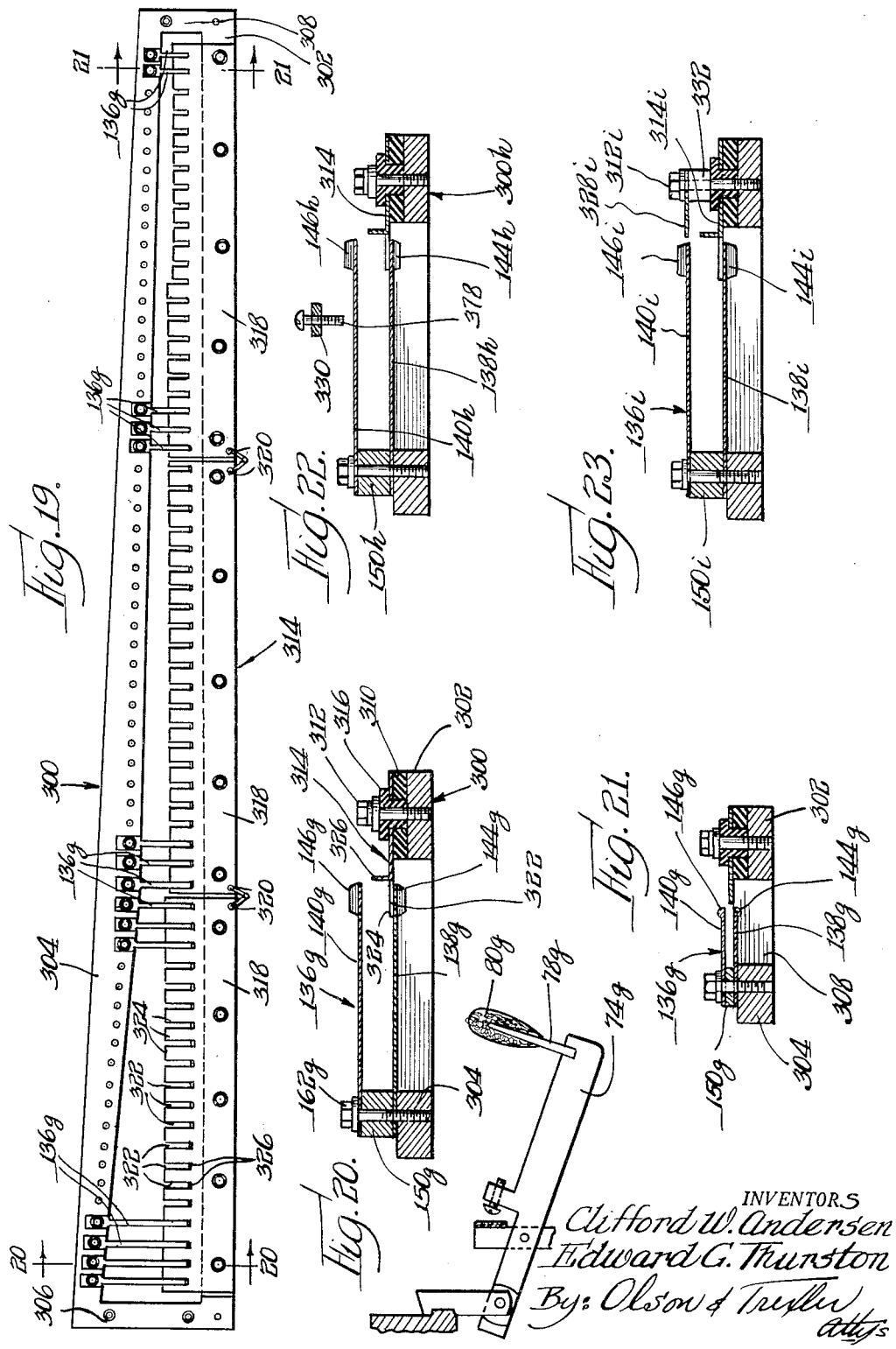

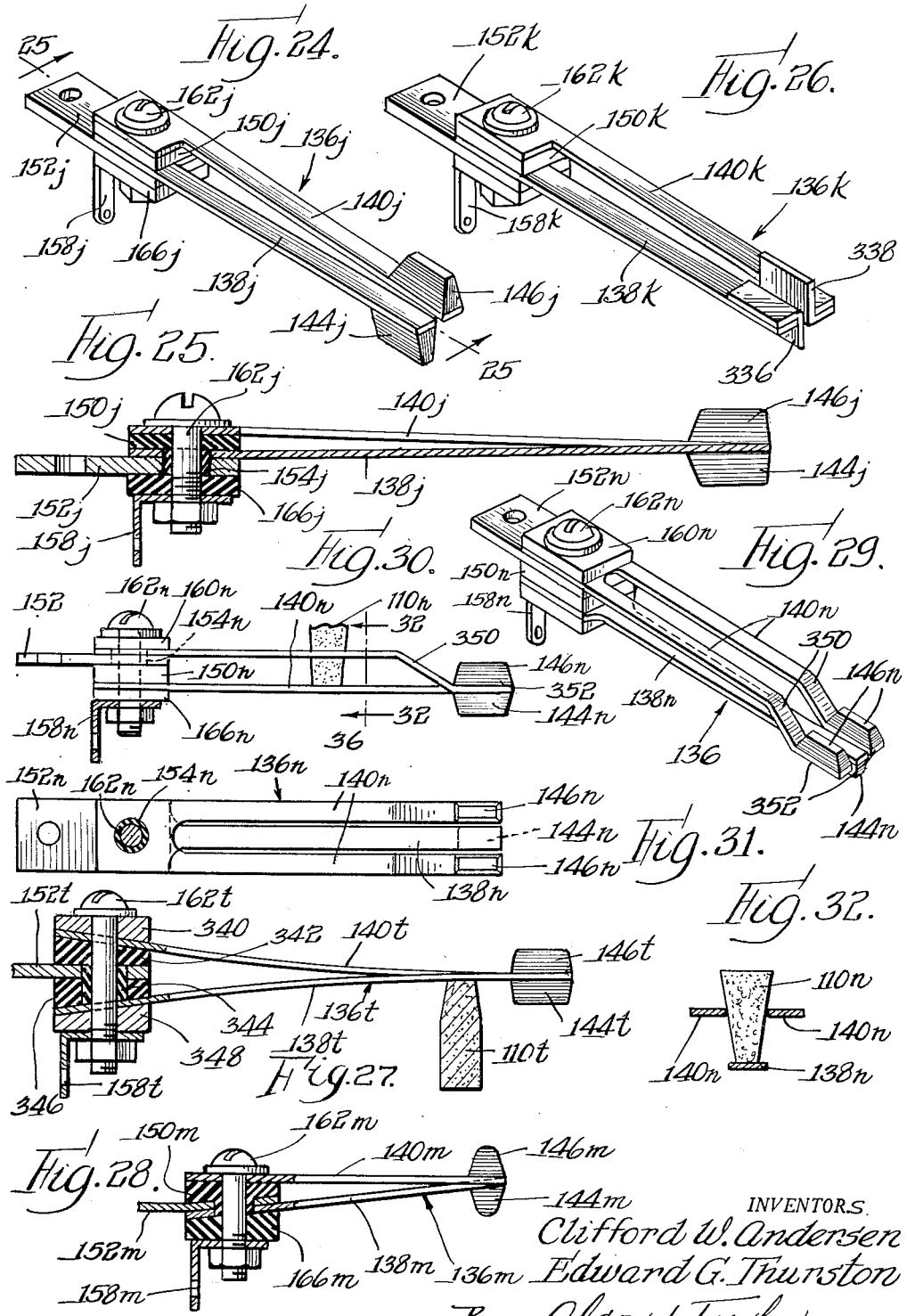

United States Patent Office 2,998,741
Patented Sept. 5, 1961

2,998,741
ELECTRONIC PIANO
Edward G. Thurston, Chicago, and Clifford W. Andersen, De Kalb, Ill., assignors, by direct and mesne assignments, to The Rudolph Wurlitzer Company, Chicago, Ill., a corporation of Ohio
Filed Oct. 29, 1956, Ser. No. 619,073
6 Claims. (Cl. 84—1.14)

This invention is concerned generally with the musical arts, and more particularly with improvements in an electronic piano.

This application comprises a continuation-in-part of application Serial No. 550,880, filed December 5, 1955, entitled "Electronic Piano," now abandoned.

The pianoforte, or piano, as it is commonly termed, is an extremely popular instrument, and it is found throughout the world. In its conventional form, the piano is quite large and heavy. Movement of conventional pianos therefore is quite difficult, and such pianos usually are limited accordingly to first floor locations, and to the largest room in a house. This often can be extremely undesirable from the standpoint of the student or casual pianist, and also from the standpoint of other persons occupying the same residence. Furthermore, conventional pianos are quite expensive, and they are subject to detuning and deterioration with age or by unfavorable climatic or atmospheric conditions.

It has been proposed that the foregoing difficulties be substantially reduced by the provision of an electronic piano. It is known that a tuned reed having an electrical potential applied to it and vibrated near a conductive member will form with that member a variable capacity giving rise to an electrical oscillation which can be translated into a musical tone. It further has been found that when such reeds are percussively actuated, remarkably realistic piano tones can be produced if the various elements of the electronic piano are properly correlated, and the electrical oscillations generated are properly amplified and converted into audio oscillations.

The conductive members or pickup members associated with such vibrating reeds have been fixed in position. It has been necessary to secure the vibrating reeds tightly onto a mount of rather substantial mass to preclude damping of the reeds. It will be apparent that such mass is undesirable in a portable instrument.

Accordingly, it is an object of this invention to provide an improved vibrating tone generator for an electronic piano.

It is another object of this invention to provide a vibrating tone generating device for an electronic piano which imposes substantially no reaction on a mount therefor.

A further object of this invention is to provide a vibrating reed tone generating device for an electronic piano wherein a pair of vibrating elements mutually sustain each other in vibration.

Yet another object of this invention is to provide a tone generating unit for an electronic piano comprising a vibrating tone generating reed and pickup reed wherein the tone generating reed and pickup reed react upon one another, and thereby substantially avoid reaction on a mount.

A further object of this invention is to provide an improved vibrating tone generator for an electronic piano which produces the unison effect of a pair of strings beating against one another, and which is practically indistinguishable from a conventional piano.

It is a further object of this invention to provide a tuned electrical element having many of the characteristics of a tuning fork, but wherein the pair of vibrating members are electrically isolated from one another, and wherein the element is made of relatively cheap sheet metal stampings.

Other objects of this invention include the provision of novel means for instituting vibration of vibratory tone generators in electronic pianos, and the elimination of piano actions.

Various additional objects and advantages of the present invention will be apparent from the following description when taken in connection with the accompanying drawings wherein:

FIG. 1 is a perspective view of an electronic piano constructed in accordance with the principles of the invention;

FIG. 2 is an enlarged vertical cross sectional view through the piano as taken substantially along the line 2—2 in FIG. 3;

FIG. 3 is a fragmentary horizontal view partially in section as taken along the line 3—3 in FIG. 2;

FIG. 4 is a fragmentary vertical sectional view on a greatly enlarged scale taken substantially along the line 4—4 in FIG. 3;

FIG. 5 is a fragmentary top view of a portion of the tone generating assembly as taken substantially along the line 5—5 in FIG. 4;

FIG. 6 is a vertical cross sectional view through the tone generating assembly in the treble portion thereof;

FIG. 7 is a perspective view of a bass tone generator corresponding to the section 7—7 in FIG. 5;

FIG. 8 is an enlarged vertical sectional view through the bass tone generator as taken along the line 8—8 in FIG. 7;

FIG. 9 is a vertical cross sectional view through the end of the bass tone generator as taken along the line 9—9 in FIG. 8;

FIG. 10 is a perspective view of one of the treble tone generators;

FIG. 11 is an enlarged vertical sectional view as taken substantially along the line 11—11 in FIG. 10;

FIG. 12 is a view similar to FIG. 4 showing a modification of the invention wherein the tone generators are movable in place of the hammers;

FIG. 13 is a generally similar view showing the tone generators mounted directly on the piano keys and eliminating the conventional piano action;

FIG. 14 is a top view of the mechanism of FIG. 13 taken substantially along the line 14—14 of FIG. 13;

FIG. 15 is a view generally similar to FIG. 13 and showing another modification of the invention;

FIG. 16 is another similar view showing yet a further modification of the invention;

FIG. 17 is a side view of a tone generator usable in any of the prior embodiments of the invention and capable of producing additional musical tones;

FIG. 18 is yet another side view of a fragment of a tone generator showing a still different arrangement for obtaining additional musical tones;

FIG. 19 is a plan view of a bar or frame and associated parts used with a fixed pickup;

FIG. 20 is a vertical sectional view in the bass section of the embodiment of the invention shown in FIG. 19 as taken along the line 20—20 therein;

FIG. 21 is a view similar to FIG. 20 in the treble section taken along the line 21—21 in FIG. 19;

FIG. 22 is a similar view showing an added pickup;

FIG. 23 is another similar view showing a modified added pickup;

FIG. 24 is a perspective view showing a pair of reeds mounted in side-by-side arrangement;

FIG. 25 is a longitudinal sectional view thereof substantially along the line 25—25 in FIG. 24;

FIG. 26 is a view similar to FIG. 24 with the reeds modified;

FIG. 27 is a side view of side-by-side reeds showing damping thereof;

FIG. 28 is a side view of treble range side-by-side reeds;

FIG. 29 is a perspective view of a superior modified multi-reed arrangement;

FIG. 30 is a side view of the reeds of FIG. 29;

FIG. 31 is a top view thereof; and

FIG. 32 is a cross-sectional view along the line 32—32 in FIG. 30 showing damping of the reeds.

Referring now in greater particularity to the drawings, and first to FIGS. 1–3, there will be seen an electronic piano 30 constructed in accordance with the principles of my invention. The piano includes a case 32 preferably formed of wood or plywood and having at the front end thereof a keyboard 34 comprising a plurality of piano keys 36 corresponding to the usual black and white keys of a conventional piano. The case also includes a fall board assembly 38 having a wire music rack 40 pivotally mounted thereon. The wire music rack is capable of pivoting movement into position substantially against the keyboard 34 (not shown) so that a call cover (not shown) may be placed over the keyboard, fall board assembly, and music rack for transportation of the piano.

The piano case is mounted on four legs 42 which are detachably attached to the case, preferably by means such as threaded fasteners so that the legs quickly may be removed for ready transportation of the piano. A foot pedal 44 for releasing the dampers is detachably connected to the piano by means such as a flexible cable 46 of the type known as a Bowden cable. The piano is provided with an electronic amplifier indicated generally at 47 mounted within the case 32 and connected to a loudspeaker 48 opening through suitable louvers (not shown) in the back of the case. Controls 50 are provided at the side of the case for the amplifier, or more conveniently may be located at some other position on the case.

A bed 52 is mounted on the bottom of the case on the inside thereof, and a balance rail 54 extends across this bed. The keys 36 of the keyboard 34 are pivotally mounted on the balance rail by means of the usual balance key pins 56 and felt pads or washers 58 surround these pins. The top surface of the balance rail supports the keys 36 in the inclined position shown in the drawings with the inner ends of the keys 36 resting on a felt pad 60 at the inner end of the bed. At the outer or front end of the bed there is provided a front rail carrying a plurality of front key pins 64. A felt pad 66 is provided on the front rail at the outer edge thereof immediately adjacent the outer ends of the keys to limit downward movement of the outer ends of the keys.

Support means such as wood blocks 68 are mounted at opposite ends of the case, such as by screwing and gluing the blocks in place. A main rail 70 (FIGS. 2–4) extends across the piano, being appropriately secured at the opposite ends thereof to a pair of the blocks 68. Butt flanges 72 are spaced along the lower front corner of the main rail and pivotally support hammers 74 including shank portions 76 and heads 78 having felt pads 80 thereon. Abutments 82 project upwardly from the shanks adjacent the mid portions thereof, and the shanks are provided with vertical apertures adjacent the abutments 82 and toward the pivotal connections to the butt flanges 72. Round or button head screws 84 are threaded through the abutments 82 to provide adjustable abutment.

A jack 86 is provided with a shank 88 which extends through the slot in the shank of each corresponding hammer, being secured therein by a transverse pivot pin. The upper end of the shank protrudes above the hammer shank and is provided with an abutment pad 90 of felt or the like engageable by the abutment screw 84. The jack also includes a relatively large body portion 92 having a jacking surface 94 and a recess 96 on the bottom thereof, the jacking surface and recess both being covered with felt 98. At the lower front corner of each jack there also is provided a felt pad 100 engageable by a spoon 102 on the hammer shank for determining the rest position of the jack as shown in FIGS. 2 and 4. A capstan screw 104 threaded into each key engages beneath the felt 98 of each corresponding jack. Each capstan screw is vertically adjustable by rotation of the screw, as is conventional.

A plurality of damper flanges 106 is spaced along the upper front edge of the main rail 70, and each damper flange pivotally supports a damper 108, except at the extreme treble end of the piano wherein short dummy dampers are provided which function only to preserve a uniform touch for all of the keys. Each damper lever is provided at its forward or outer end with a depending felt tip or pad 110. A push wire 112 is pivotally connected to each hammer shank 76 and extends upwardly through the corresponding damper lever 108, an abutment 114 being adjustably located on the wire 112 and engaging beneath a felt washer 116 to lift the lever 108. A head or nut 118 threaded on the top of the damper lever provides for lowering the damper lever when the corresponding hammer 74 is lowered.

Each damper lever 108 includes a butt end 120 extending rearwardly of the pivotal connection to the damper lever flange 106. A felt pad 122 is provided on top of each butt. A damper release rod 124 extends above all of the pads 122, and is provided with radially offset end portions 126 pivotally received in brackets 128 mounted on the opposite ends of the main rail 70. A lever 130 extends generally radially from one end of the damper release rod 124 and is provided at its outer end with a pivotally connected pull rod 132. The pull rod is actuated by the Bowden cable 46 from the foot pedal 44 in such manner that when the foot pedal is depressed the pull rod 132 is lowered and the lever 130 is turned to depress the rod 124 against the pads 122, whereby simultaneously to retract all of the dampers.

A tone generator support 134 extends across the piano, and conveniently takes the form of an inverted channel secured at its opposite ends to a pair of the blocks 68. For purposes of reducing the weight of the piano to a minimum, it is contemplated that this support, bar, or channel conveniently would be made of aluminum. A plurality of tone generating assemblies or sub-assemblies 136 is spaced across this channel as hereinafter will be apparent, the tone generating sub-assemblies being individually engageable by the heads of the hammers 74, and also individually engageable by the pads 110 of the dampers 108.

It will be apparent that when one of the keys 36 is depressed by the finger of a pianist the inner end including the capstan screw 104 thereon will rise. The capstan screw lifts beneath the jack, and thereby pivots the hammer 74 upwardly. When the abutment screw 84 engages the abutment pad 90 the jack is pivoted so that the jacking surface 94 is moved away from the head of the capstan screw, and the recess 96 receives the capstan screw. The capstan screw therefore ceases to raise the action including the hammer 74, and the action continues to rise by inertia until the padded hammer head engages the corresponding tone generator 136, the hammer then dropping to allow free vibration of the tone generator. It will be apparent that such pivotal movement of the hammer causes the pad 110 of the damper to be raised out of contact with the tone generator. The damper returns to damping position when the key is released.

Each generator or tone generating sub-assembly 136 comprises a pair of reeds, hereinafter referred to as the tone generating reed 138 and the pickup reed 140. Preferably all of the reeds are shielded by means such as an aluminum angle member 142 extending completely across the piano.

The reeds are tuned to the frequency of the sound which they are to generate, and accordingly the reeds vary in length from one end of the keyboard to the other, being longest at the bass end, and shortest at the treble end. In addition, the reeds may vary somewhat in width to help in determining the period of vibration. FIG. 5 illustrates the variation in size from one end of the keyboard to the other. FIG. 4 illustrates the manner in which the bass tone generators cooperate with the piano actions, while FIG. 6 illustrates the manner in which the treble tone generators cooperate with the piano actions.

Each pair of reeds is tuned to the same frequency, and is mechanically connected fairly rigidly, but is electrically insulated. Thus, referring specifically to the bass reeds shown in FIGS. 7 and 8, the tone generating reed 138 is positioned for engagement by the hammer. In addition to the dimensions of the reed itself, tuning is effected by means of a lead weight 144 provided on the underside of the reed at the tip thereof. This weight makes it unnecessary to construct the reed of prohibitively large size, and also provides for ready tuning of the reed by adding to the weight, or by filing some of the lead from the weight to reduce the weight. The pickup reed 140 is of generally similar construction, also having a weight 146 thereon for tuning purposes. In addition, and specifically in the bass reeds, there can be provided a channel, shroud, or skirt 148 depending from the pickup reed substantially to the level of the tone generating reed. Vibration of the reeds causes the tone generating reed to pass into and out of this skirt or shroud, thereby profoundly affecting the capacity field between the two reeds. It is possible to obtain a great many different types of sound effects by varying the shape of the skirt or shroud, and it will be observed that the one herein shown by way of specific illustration is of generally trapezoidal shape.

An insulating mounting block 150, such as of phenolic, is positioned between the reeds, and a steel tongue 152 is positioned between one of the reeds, such as the tone generating reed 138, and the insulating block 150. The steel tongue 152 makes an electrical connection with the reed 138, and it will be understood that all of the reeds preferably are made of spring steel. The block is provided with oppositely extending bosses 154 and 156 projecting through the reeds. The boss 154 also extends through a metal connecting tab 158. An insulating washer 160 overlies the tab 158, and a bolt 162 extends through the washer 160, and through the insulating block 150 including the bosses 154 and 156 thereof. A metal washer 164 surrounds the boss 154 for maintaining electrical contact between the tab 158 and the pickup reed 140. The boss 156 extends both through the metal tongue 152 and through the reed 138, and a rubber or other insulating washer 166 is held against the reed 138 by a nut 168 threaded on the bolt 162. Obviously, other mounting means could be used for the reeds. The important features are that the reeds of each tone generator are electrically insulated from one another, and are physically interconnected by a relatively hard part.

Continuing further with the specific illustrative embodiment, the tongue 152 is mounted on the channel 134 by means of a bolt 170, resilient insulating material such as rubber in the form of washer 172 being positioned above and below the tongue to provide a resilient shock mount on the channel. An insulating sleeve 174 is positioned between the bolt 170 and the tongue 152 electrically to insulate the tongue from the bolt. This sleeve may be a portion of one of the washers 172 if it is so desired, and also electrically insulates a connecting tab 176 from the bolt, the tab being in electrical engagement with the tongue 152. The tabs 158 and 176 are connected to the wires of a shielded cable 178. The larger area of the pickup reed 140 due to the skirt or shroud 148 thereon makes it desirable that this reed, via the tab 158, be connected to the grounded lead of the cable 178, the other tab 176 being connected to the center or biasing wire of the cable. The wires of the cable 178 at the other end are connected to the input circuit of an amplifier in any known or suitable manner such that the variation in capacity between the reeds 138 and 140 upon vibration thereof will produce changes in potential which are amplified and applied to a loudspeaker to produce audible piano tones.

When the tone generating reed 138 is struck by its hammer, the reed starts to vibrate. Likewise, the pickup reed 140 starts to vibrate sympathetically with the reed 138, equally and opposite thereto. Damping of one reed, such as the pickup reed 140, causes both reeds to stop vibration. This is of considerable importance considering the space requirements of an electronic piano in that one reed can be struck, and the other damped.

Since the reeds vibrate in equal and opposite directions and distances, they react on one another, and not on the mount. The rubber or other soft insulating washers 172 further prevent reaction of the reeds on the mount as exemplified by the channel 134. Thus, all the channel has to do is hold the reeds in position. It does not have to be massive to preclude damping of the reeds. In fact, it is undesirable to provide a massive mount with the tone generators rigidly affixed thereto. Each reed vibrates a lesser distance than a single reed would alone. Thus, if the maximum amplitude of vibration of one reed alone would be one-half inch, the maximum amplitude of vibration of each of the two reeds 138 and 140 is only a fraction thereof. Accordingly, longevity of the reeds is extended immeasurably.

It has been noted heretofore that the two reeds 138 and 140 of any given tone generator are tuned to the same frequency. Actually, tuning to exactly the same frequency is practically impossible. Thus, one reed tends to vibrate at its natural frequency, and the other is in forced vibration, and this may shift back and forth from time to time as the two reeds relatively tend to approach the same frequency of vibration. As a result there is a certain amount of "hunting" action with phase shifting between the two reeds. Oscillograms of the electrical oscillations generated by means of the tone generator 136 reveal definite breaks corresponding to phase shifts in the odd harmonics. This is characteristic of piano tones wherein the multiple strings struck by a hammer operate as a unison and provide phase changes resulting in similar oscillograph tracings. The oscillograms or oscillograph tracings of the fundamentals and the first several harmonics, both odd and even, of the tone generator 136 are practically identical with those produced by a piano, and the difference between the audible tones emanating from the loudspeaker associated with the amplifier to which the tone generator 136 is connected are substantially indistinguishable by ear from the tones of a piano.

This result is quite surprising in view of the fact that it heretofore was thought necessary to provide a fixed pickup in connection with a vibrating reed to produce piano tones, and it further was thought necessary to mount the reeds on a massive support to prevent damping of the reeds.

Mounting of the treble reeds as shown in FIGS. 10 and 11 is quite similar to that of the bass reeds as shown in FIGS. 7 and 8. The tone generating reed 138 is positioned considerably closer to the pickup reed 140 than is the case with the bass reeds due to the relatively small capacitance between them and due to the relatively small amplitude of vibration. Consequently, the block 150 between the reeds is of much less height, and conveniently comprises a mica washer. The treble reeds, like the intermediate reeds, lack the skirt or shroud of the bass reeds. A further difference in the treble reeds is that the metal tongue is replaced by a contact metal washer 152, and the tab 176 serves both to mount the tone generator and to provide an electrical contact to the tone generating reed 138. This tab preferably is of beryllium copper, and provides an excellent shock mount in addition to the rubber or other soft insulating washer 172.

It will be seen that the mounting of the treble reeds, although differing in detail from that of the bass reeds, is functionally identical, with the possible exception of the dual functioning of the tab 176 in the treble reeds. In connection with this tab, it is also within the contemplation of the invention that one of the reeds might be extended a sufficient distance to comprise the tab 176 as an integral part of that reed. This would reduce the number of necessary parts, and accordingly would reduce the cost of construction, while at the same time providing an excellent resilient mounting for the tone generator on the channel 134.

A modification of the invention is shown in FIG. 12. In this embodiment of the invention the parts are similar to, or analogous to, those previously described. Hence, similar numerals with the addition of the suffix $a$ are utilized to identify such parts, thereby allowing description to be kept to a minimum.

The embodiment of FIG. 12 represents a partial reversal of parts over that heretofore shown and described. Thus, the hammer shank 74a is cut off at 180 short of the normal position of the hammer head, and the tone generator 136a is mounted on the hammer 74a. The tone generator is mounted in inverted position so that the pickup reed 140a rests against a felt pad 110a on a fixed damper 108a extending completely across the piano. Thus, a single damper acts on all of the tone generators. A single hammer 78a extends completely across the piano and is mounted in fixed position above the tone generators 136a, having a striking pad 80a of felt or the like thereon. Accordingly, when any one of the keys 36a is depressed, the corresponding action is moved upwardly. The tone generator 136a is moved upwardly to remove the pickup reed 140a from the damper pad 110a, the tone generating reed 138a eventually being thrown against the striker pad 80a of the hammer 78a to start oscillation of the reeds. It will be understood that with the capstan screw 104a received in the recess 96a and bearing against the felt 98a therein, the tone generator 136a will be held in an intermediate position somewhat short of the felt 80a on the hammer 78a, and above the damper felt 110a as long as the key 36a is depressed. Tone generation is identical with that previously described.

A further embodiment of the invention is shown in FIGS. 13 and 14 wherein the piano action is eliminated. More specifically, the tone generators 136b are mounted directly on the inner ends of the keys 36b. Similar numerals again are used, this time with the suffix $b$, to identify similar parts, thereby to obviate extended description. Provision for starting the reeds in oscillation upon depression of the key in this instance is made in the form of a permanent magnet 182. In the present instance a horseshoe magnet is shown, but it will be understood that a bar magnet, or a magnet of any other configuration could be used. Furthermore, although an individual magnet 182 is shown in connection with each tone generator or pair or reeds, it is within the contemplation of the invention that a single magnet could extend across the entire width of the keyboard. Individual magnets provide an advantage in that their positions can be varied selectively to vary the effect on the tone generators. When one of the keys 36b is depressed the reeds 138b and 140b tend to rise with the key. However, the reed 140b is restrained by the magnet 182 until such time as the attractive force of the magnet is overcome. The reed 140b then leaves the magnet with a snap action, and starts to vibrate. The reed 138b then vibrates sympathetically in the same manner as heretofore described. When the key is released for return to its rest position the reed 140b reengages the magnet 182 and the magnet thereby acts as a damper to stop vibration of the reeds 138b and 140b. A thin coating 184 of some soft or resilient material, such as felt, rubber, or plastic is preferably applied to the top of the magnet 182 so as to avoid any metallic clicks or clatter upon return of the reed 140b against the magnet 182. It will be understood that tone generation remains the same as previously disclosed.

In the embodiment of FIG. 15 the tone generators 136c again are mounted on the keys 36c. Again, similar numerals are used, this time with the suffix $c$, to identify similar parts. The main rail 70c is positioned above the keys, a plurality of butt flanges 72c is mounted along the lower rear edge of the main rail, and a plurality of hammers 74c is mounted thereon. The hammers in this instance are provided with a relatively long shank 76c and a relatively long butt 186, the latter being pivotally connected to the corresponding butt flange 72c. A butt spring 188 may be provided to hold the hammer down against a stop 190 preferably provided with a felt or other pad 192. It will be understood that the stop extends completely across the keyboard and serves as a common stop for all of the hammers. A post or jack 194 having a pad 196 as of felt on the top thereof is provided on the key beneath the butt 186 for each note.

The parts are dimensioned so that when any one of the keys 36c is depressed, its corresponding tone generator 136c is raised until the tone generating reed 138c engages the pad 80c of the head 78c. An instant after such engagement the pad 196 on the post 194 engages the butt 186 to lift the same, whereby to move the hammer 74c to the dashed line position, the head thereby being withdrawn from the reed 138c to allow undamped oscillation of the tone generating reed 138c and the pickup reed 140c. Upon return of the parts to rest position a damper pad 110c on a damper 108c engages the pickup reed 140c to damp vibrations of the tone generator.

In FIG. 16 there is shown another embodiment of the invention wherein the tone generator 136d for each note is mounted on the corresponding key 36d. In the rest position illustrated the tone generating reed 138d engages the pad 110d of a damper 108d extending completely across the keyboard. When a key is depressed the inner end thereof is thrown up against the stop 198 having a pad 200 thereon. The pad is only to damp noises, and does not substantially reduce the impact of the key against the stop. The inertia of the reeds 138d and 140d tends to cause them to rise after the key has struck the stop, whereby the inertia of the reeds starts them in vibration. The reeds are damped by the damper pad 110d upon release of the key.

In all of the previously described embodiments of the invention the tone generators have remained unchanged. Various positions for mounting the tone generators, and various means for effecting vibration thereof have been disclosed. In FIG. 17 there is disclosed a modification of the tone generator, and this modification can be used with any of the previously disclosed embodiments of the invention. More specifically, the tone generator 136e comprises all of the parts previously described, such parts again being identified by similar numerals, but with the addition of the suffix $e$. The modification in this instance comprises the addition of a further pickup reed 202. This pickup reed is mounted by means similar to that previously described, and is rigid with the tone generating reed 138e, but electrically insulated therefrom. In accordance with the specific embodiment of FIG. 17 the reed 202 is tuned to a harmonic of the reed 138e. Alternatively, the additional reed 202 would be tuned to the fundamental of the reed 138e, and a skirt, shroud, or channel of the same general type as the skirt 14Se, or even of a different type could be provided, thus providing a single 180° out of phase for obtaining various musical effects, or by suitably shaping the shroud, or skirt, to provide a signal of different character. The reed 138e and the reed 140e coact as heretofore described, and the additional reed 202 coacts with the reed 138e in generally the same manner, but adds an additional signal.

A further modified pickup is shown in FIG. 18, the basic parts of the tone generator 136f remaining the same as previously described, and being similarly numbered with the addition of the suffix f. The difference resides in the provision of a plurality of conductive tongues 204 or the like forming pickup elements mounted off the ends of the reeds 138f. The tongues or pickups 204 are mounted on an insulating member 206 independently of the reeds 138f and 140f, and this type of pickup would be useful primarily with the form of the invention wherein the tone generators 136f are mounted in fixed position and are actuated by more or less conventional piano actions. The reeds 138f and 140f continue to coact in the manner heretofore described. The pickup 204 provides an additional tone of different character, for instance a trumpet tone.

In accordance with the invention as heretofore shown and described, there is disclosed a novel electrical element, specifically a tone generating element, having various modifications, and having novel means for mounting and operating the element. Each element, or tone generator, or pair of reeds comprises a structure which is dynamically balanced in space. Therefore, substantially no reaction is imposed on supporting or mounting structure, and such supporting or mounting structure is not subject to stringent requirements. The dynamic balance of the pair of reeds is somewhat similar to the dynamic balance of a tuning fork, but differences are substantial. The reeds comprise two cheap stampings which are much lighter in weight, and which are much simpler to fabricate than is a tuning fork. Furthermore, the reeds are electrically insulated from one another, and the tines of a tuning fork obviously cannot be insulated from one another. Such electrical insulation is absolutely essential for use as a capacitive type tone generator as herein contemplated.

Although the reeds must be electrically insulated, they must be interconnected by a hard material to avoid damping of the reed vibrations. On the other hand, fairly nonmassive, loose or resilient mounting of each pair of reeds or tone generator is necessary to prevent undue reduction of the close dynamic coupling between the reeds which is essential for proper operation.

Since one of the reeds vibrates sympathetically with the other, a certain amount of phase shifting is found. The tone produced is substantially identical with the unison of a piano, and oscillograph tracings or oscillograms of the tones reveal dips caused by phase shifts in the odd harmonics. This is characteristic of piano tones, and the oscillograms are remarkably similar to oscillograms of conventional piano tones. It is possible that the phase shift is brought about or enhanced by differences in natural frequencies, probably minute differences, of a pair of reeds.

Various tonal effects can be provided by the addition of further pickups, such as a third reed, or a pickup off the end of the tone generating reed. The wave shape produced by many of the reeds is influenced considerably by the skirt or shroud on the pickup reed. A brilliant tone is produced by positioning the skirt in one position, while softening of the tone can be produced by positioning this skirt differently. Various desirable or novel results can be obtained by varying the shape of the skirt.

With the two reeds vibrating against one another, the amplitude of vibration of each reed is materially less than the amplitude of vibration of a single reed for a given amount of energy. Thus, fatigue is reduced considerably, and reed life is extended immeasurably.

In some instances it may be desirable that one reed of the reed pair be constructed to have a natural frequency which is a harmonic of the other reed, rather than that the reeds be constructed to have substantially the same natural frequency.

Various means for instituting vibration of the reeds have been disclosed. In all of these the weight has been reduced over prior pianos, and in many of them the actions have been eliminated, thereby further reducing the weight and expense. It will be noted that in the form of the invention wherein vibration is instituted by the plucking action of a magnet, that the magnet acts both to institute vibration, and to damp vibration when the reeds are returned to rest position.

It will be appreciated that when the actions are eliminated, problems of alignment also are eliminated or reduced. Accordingly, a much lighter case can be used than heretofore has been possible.

Heretofore, in electronic pianos utilizing vibrating reeds, the amount of output power which can be radiated from a loudspeaker in the case has been limited by problems of acoustical feedback. There also has been some problem of mechanical coupling of reeds of different notes through their mountings. Since the reeds are shock mounted as herein disclosed, there is not any problem of acoustical feedback or mechanical interaction between the reeds of different tone generators. The resilient or shock mounting also makes hammer spacing less critical, since a tone generator or pair of reeds merely will deflect somewhat farther if the hammer is positioned too close to them.

Since the reeds react upon one another, and not on the support or mount, any slight tendency toward reaction on the mount being overcome by the resilient or shock mounting, the support or mount conversely has no reaction on the reeds. Thus, the mount cannot cause any reed damping or "dead spots" along the scale.

The reaction of the reeds upon one another can be taken advantage of in a somewhat different type of electronic tone generating system wherein fixed pickup means are provided for cooperation with one or both reeds.

Thus, referring to FIGS. 19 and 20, there is shown a plurality of reed assemblies 136g. Each reed assembly comprises a primary reed 138g and a secondary reed 140g, respectively having the tuning weights 144g and 146g. In the present embodiment of the invention the reeds are not insulated from one another, but rather are separated at their bases by a steel spacer 150g, a bolt 162g passing through the bases of the reed and through the spacer and being threaded into a mounting structure.

The mounting structure comprises a frame or bar 300 which conveniently can be formed of cast aluminum. The frame 300 is of generally rectangular outline comprising a front bar 302, a rear bar 304, a bass end bar 306, and a treble end bar 308. The bolts 162g are threaded into the rear or back bar 304 with the reeds extending toward the front bar 302. An insulating spacer bar 310 is mounted on top of the front bar 302 by means including bolts 312 threaded into tapped apertures in the front bar.

The bolts 312 also mount a pickup structure 314 on top of the insulating bar 310, and are spaced from the pickup structure by means such as insulating bushings 316, or insulating washers. The pickup structure 314 comprises one or more sections 318 of sheet metal, conveniently of aluminum. When more than one section is used, the sections preferably are electrically interconnected by means such as jumpers 320. The sections of the pickup structure extend toward the reeds and have slots 322 formed therein, and in which the primary reeds vibrate. The slots 322 leave fingers 324 lying on opposite sides of the reeds, and struck up fingers 326 may be provided in the bass region for controlling capacitance effects. Preferably, each primary reed 138g is mounted so that its upper surface substantially coincides with the lower surface of the pickup structure 314. Thus, the downward vibration of each reed 138g carries it below the associated pickup. However, on the upward swing the reed does not pass above the top limit of the pickup, such limit in the bass region comprising the upper ends of the fingers 326, and in the treble region comprising the top surface of the pickup section.

The reed assemblies are positioned so that the primary reeds 138g will be struck by the felt pads 80g on the heads 78g of the hammers 74g in the manner contemplated heretofore.

The present embodiment of the invention has been directed mainly with regard to the bass reeds in FIGS. 19 and 20. The principles apply equally to the treble reeds which are shown in FIG. 21 (and also in FIG. 19), further description of the treble reed structure therefore being deemed unnecessary.

Several advantages are possessed by the foregoing structure as compared with the prior art single reed tone generators. For one thing, since the reeds of each pair react upon one another, there is substantially no reaction imposed on the frame 300. Thus, it is for this reason that the frame conveniently can be made of aluminum, and can be of sufficiently small dimensions as to be quite light in weight. Both reeds of each pair are maintained at ground potential by being bolted to the back bar of the frame. As will be understood, the pickup structure is electrically connected to the amplifier so that capacitance variations between the primary reeds and the pickup structure effect generation of electrical oscillations which are amplified and transduced to produce audible musical tones.

If only a single reed were to be used, the supporting frame would have to be quite heavy and rigid to prevent sympathetic vibration thereof due to reaction of the reeds on the frame. Thus, the double reeds effect a substantial savings in weight and material. Furthermore, the double reeds sustain one another in vibration, thereby providing a desirably long decay time. For a given energy input, each reed vibrates at an amplitude only a fraction of what a single reed alone would vibrate. This extends reed life, and also makes it possible to use shorter upstanding fingers 326 than would be necessary with a single reed. Furthermore, striking and damping of the reeds is materially simplified since one reed can be struck, and the other can be damped.

Advantages other than those discussed with regard to FIGS. 19–21 can stem from the double reeds. Specifically, other types of pickups can be used, and pickups cooperable with the secondary reeds can be used. With specific reference to FIG. 22 wherein the parts are generally similar to those just described, and wherein similar numerals therefore are utilized with the addition of the suffix h, there is shown a pickup 328 positioned directly above the secondary reed 140h. The pickup 328 comprises a screw threaded through an insulating support 330. The support conveniently extends completely across the piano above all of the reeds, and one or more screws 328 may be provided for cooperation with each secondary reed. Pickups positioned above the secondary reeds in this manner may produce an organ-like tone. The tone screws 328 are connected to the amplifier independently of the primary reed pickup structure 314 so that a piano or organ tone can be produced independently, or simultaneously as desired.

A modified structure is shown in FIG. 23 wherein there is provided a pickup 328i positioned off the end of each secondary reed 140i. The secondary pickup 328i conveniently comprises a plurality of tongues aligned with the secondary reeds, and the secondary pickup may be supported along with the primary pickup 314i by the bolts 312i, suitable insulated spacer means 332 being interposed between the pickups. A secondary pickup positioned off the end of the reed will produce a trumpet-like tone, and a trumpet tone thus may be produced independently of or simultaneously with the piano tone. A tone screw pickup also could be provided above the secondary reed further to produce an organ tone from the same tone generators.

A further embodiment of the invention is illustrated in FIGS. 24 and 25. In this embodiment, most of the parts are similar to those previously described, and accordingly are identified by similar numerals with the addition of the suffix j. In this instance, the reeds 138j and 140j are positioned side by side, rather than above one another. The tips of the reeds are substantially coplanar, but the bases are slightly offset. It is contemplated that the bases might be made coplanar, so that the reeds would be coplanar throughout their lengths. However, this would make mounting of the reeds somewhat more difficult, and would not necessarily result in improved results inasmuch as most of the capacity change is between the adjacent tips of the reeds, since the greatest extend of vibration is at the reed tips.

The advantages of the side-by-side reeds as shown in FIGS. 24 and 25 is that regardless of how far the reeds may vibrate, they will never encounter one another. Thus, a considerable amplitude of vibration, with accompanying large change in capacity, can be attained readily. In the case of the bass reeds, in particular, the vibrational amplitudes are rather substantial, and initial spacing of rather substantial distances is necessary in the case of vertically aligned reeds, such as shown in FIG. 7, for example, in order to avoid engagement of the reeds during extreme excursions of the ends of the reeds in oscillation.

A minor modification will be noted in FIGS. 24 and 25, in that the connecting tab or terminal 158j is not mounted on the top of the assembly, immediately adjacent the reed 140j, as in previous embodiments, but rather is mounted at the bottom of the assembly, and is connected through the screw or bolt 162j to the pickup reed 140j.

The offset or side-by-side reeds are shown in FIGS. 24 and 25 with the lead weights 144j and 146j affixed to the ends thereof substantially as previously described. An improvement over this construction is shown in FIG. 26 wherein sheet metal flanges or angle members 336 and 338 are spot welded on the ends of the reeds in place of the lead weights. The mass of the flanges 336 and 338 is predetermined so that these flanges serve the same purpose of tuning the reeds as do the lead weights, such as 144j and 146j. Furthermore, higher initial capacity is imparted to the reeds due to the parallel, substantially confronting flanges of the angle members 336 and 338. Furthermore, proper shaping of these flanges controls the capacitance field between them, and hence controls the harmonics produced by the vibrating reeds, thus allowing various musical effects to be created.

A slightly modified construction is shown in FIG. 27 wherein the reeds 138t and 140t are slightly curved throughout their lengths, thereby allowing greater spacing of the reed bases, while still having a large active portion of the reeds substantially coplanar. The mounting structure in this instance is somewhat different. It still includes a bolt 162t, but a metal wedge 340 is placed beneath the bolt head to make contact between the bolt head and the pickup lead 140t. A wedge 342 of insulating material underlies the base of the pickup reed 140t, and spaces this reed from the mounting tab 152t. An insulating sleeve or cylinder 344 spaces the bolt 162t from the mounting table 152t, and may be made integral with the insulating wedge 342, if so desired. A metal wedge 346 is interposed between the mounting tab 152t and the tone generating reed 138t. The insulating sleeve 344 projects through the wedge 346 as will be appreciated. An insulating wedge 348 underlies the base of the tone generating reed 138t, and the contact 158t is held against this insulating wedge by the nut threaded on the bolt 162t.

FIG. 27 illustrates one of the advantageous features of the offset or side-by-side reed. More particularly, it will be observed that the damper 110t is positioned to underlie both reeds where they are substantially coplanar. Accordingly, both reeds are simultaneously damped by the damper 110t, and there is substantially no tendency for the reeds to rebound from the damper.

A pair of treble reeds of the offset or side-by-side type is shown in FIG. 28. Parts are generally similar to those previously discussed, and similar numerals are used to identify similar parts with the addition of the suffix *m*. The bases of the reeds are vertically offset, as well as laterally offset, and the reeds are angled toward one another so that their tips are substantially coplanar. This angulation is accomplished by forming the insulating sectional piece 150*m* as a wedge. Similarly, the insulating piece 166*m* is formed as a substantially complementary wedge. Since the reed 138*m* is inclined, the reed 140*m* being substantially horizontal, the attachment tab 152*m* is inclined where it contacts the reed 138*m*, and is deflected so as to be horizontal rearwardly thereof.

Another tone generator having certain advantages is shown at 136*n* in FIGS. 29–32. In this form of the invention, the pickup reed is in the form of a pair of parallel, spaced-apart reeds or tongues, preferably having a common base.

Perhaps it would be more accurate to describe the reed 140*n* as being a split reed, rather than a pair of reeds, since this part preferably does have a common base, and since the two tongues thereof are electrically interconnected. In any event, the split reed 140*n* is provided with an offset section 350 whereby the end sections 352 are parallel to the end of the tone generating reed 138*n*, and lie on opposite sides thereof. Since the split pickup reed 140*n* lies on both sides of the tone generating reed 138*n*, there is a much larger capacity field between the tone generating and pickup reeds than is the case with the reeds heretofore discussed. As a result, for any given displacement of the reeds during vibration, there is a much larger capacitance change, and electrical signals of greater amplitude are generated, thereby leading to greater volume. It will be appreciated that the greater the volume for a given reed deflection, the better, since undue deflection may lead to metal fatigue and failure of the reeds.

In addition to the large capacity change, and hence the high volume generated, an important advantage of the tone generator 136*n* is found in damping thereof. Thus, as is shown in FIGS. 30 and 32, a wedge shaped damper extends between the tongues of the pickup reed 140*n* and engages them laterally, while engaging against the face of the tone generating reed 138*n*. The damper is thus received more or less in a pocket, and there is substantially no tendency for it to rebound or recoil away from the reeds.

Due to the size and disposition of the pickup reed or reeds 140*n*, it is preferable that this reed be maintained at ground potential. Accordingly, the mounting tab 152*n* is mounted directly beneath the bifurcated pickup reed 140*n* and an insulating sleeve 154*n* which may be integral with the insulator 160*n* extends through the reed and the metal mounting tab. An insulating block 150*n* lies between the mounting tab and the tone generating reed 138*n*, and a metal block 166*n* lies between the tone generating reed and the terminal 158*n* therefor.

The specific examples of the invention as herein shown and described are to be understood as being exemplary only. Various changes in structure will no doubt occur to those skilled in the art, and it is to be understood that such changes form a part of the invention insofar as they fall within the spirit and scope of the appended claims.

The invention is hereby claimed as followed:

1. An electronic piano comprising a case, a key movably mounted in said case for movement by the finger of a pianist, a tone generator mounted in said case and comprising a pair of electrically conductive vibratory substantially laterally flat reeds tuned to vibrate at substantially the same frequency, said pair of reeds respectively having tongues of similar size and configuration and both of substantially the same area, each of said reeds being continuous within its outline, said reeds having a common support and extending therefrom in the same direction and being electrically insulated from one another, the surfaces of said reeds being free, the reed tongues adjacent the free ends thereof and for a substantial distance back therefrom toward said support being flat, substantially parallel and in capacitive relation whereby the capacity between said pair of reed tongues varies upon vibration thereof, means adjacent said reeds and cooperating with said key for effecting vibration of said pair of reeds free of unnatural damping upon movement of said key, and translating means to which said reeds are electrically connected whereby changes in capacity between said reed tongues are converted into audible musical tones.

2. An electronic piano as set forth in claim 1 and further including a third reed tongue of similar size and configuration, providing two vibratile elements lying on opposite sides of one other reed tongue.

3. An electronic piano as set forth in claim 1 and further including a sheet metal member on one of said reed tongues near the free end thereof in capacitive relation with the free end of the other reed tongue.

4. An electronic piano as set forth in claim 1 and further including tuning weights at the free ends of the reed tongues.

5. An electronic piano as set forth in claim 1 and further including a third element in capacitive relation with both of the reed tongues.

6. An electronic piano as set forth in claim 1 wherein at least one of the reed tongues is provided with an offset near the free end thereof and transverse of the plane thereof whereby the free ends of said reed tongues are substantially coplanar.

References Cited in the file of this patent

UNITED STATES PATENTS

| | | |
|---|---|---|
| 1,906,250 | Devol | May 2, 1933 |
| 1,929,027 | Miessner | Oct. 3, 1933 |
| 2,015,014 | Hoschke | Sept. 17, 1935 |
| 2,180,122 | Severy | Nov. 14, 1939 |
| 2,187,251 | Severy | Jan. 16, 1940 |
| 2,318,936 | Fisher | May 11, 1943 |
| 2,435,140 | Koch | Jan. 27, 1948 |
| 2,465,288 | Sinnett | Mar. 22, 1949 |
| 2,474,387 | Wallace | June 28, 1949 |
| 2,834,243 | Miessner | May 13, 1958 |